US009908207B2

(12) United States Patent
Springborn (10) Patent No.: US 9,908,207 B2
(45) Date of Patent: Mar. 6, 2018

(54) IN-RAIL CONNECTOR

(71) Applicant: Russell H. Springborn, Union City, MI (US)

(72) Inventor: Russell H. Springborn, Union City, MI (US)

(*) Notice: Subject to any disclaimer, the term of this patent is extended or adjusted under 35 U.S.C. 154(b) by 530 days.

(21) Appl. No.: 14/639,562

(22) Filed: Mar. 5, 2015

(65) Prior Publication Data

US 2015/0252588 A1    Sep. 10, 2015

Related U.S. Application Data

(60) Provisional application No. 61/948,545, filed on Mar. 5, 2014.

(51) Int. Cl.
  *B23P 19/02*  (2006.01)
  *E04H 17/14*  (2006.01)
  *E04F 11/18*  (2006.01)

(52) U.S. Cl.
  CPC ............ *B23P 19/02* (2013.01); *E04F 11/1848* (2013.01); *E04H 17/1417* (2013.01); *E04F 2011/1823* (2013.01); *E04F 2011/1827* (2013.01); *E04H 2017/1447* (2013.01); *E04H 2017/1482* (2013.01); *Y10T 29/49945* (2015.01)

(58) Field of Classification Search
  CPC . E04H 17/14; E04H 17/1421; E04H 17/1426; E04H 17/1439; E04H 17/1443; E04H 17/1478; E04H 17/16
  See application file for complete search history.

(56) References Cited

U.S. PATENT DOCUMENTS

| | | | | | |
|---|---|---|---|---|---|
| 4,805,879 | A * | 2/1989 | Spera | .................... | E04F 11/181 256/22 |
| 5,660,378 | A * | 8/1997 | Schall | ................. | E04H 17/1439 256/22 |
| 6,375,166 | B1 * | 4/2002 | Schall | ................. | E04H 17/1439 256/21 |
| 6,752,386 | B1 * | 6/2004 | Bundy | ................ | E04H 17/1439 256/22 |
| 6,824,123 | B2 * | 11/2004 | Larsen | ................ | E04H 17/1439 256/21 |
| 6,969,051 | B1 * | 11/2005 | Gibbs | ................. | E04H 17/1439 256/19 |
| 7,152,849 | B2 * | 12/2006 | Graber | ................ | E04H 17/1443 256/22 |
| 7,384,025 | B2 * | 6/2008 | Lo | ........................ | E04H 17/1439 256/65.08 |
| 7,819,390 | B2 * | 10/2010 | Godwin | .............. | E04H 17/1443 24/458 |
| 8,356,801 | B2 * | 1/2013 | Howard | .............. | E04H 17/1439 256/21 |
| 8,413,332 | B2 * | 4/2013 | Duffy | .................. | E04H 17/1439 256/65.12 |

(Continued)

*Primary Examiner* — Daniel J Wiley
(74) *Attorney, Agent, or Firm* — Dykema Gossett PLLC (57) ABSTRACT

A railing assembly may include a first railing portion including a first aperture, a second railing portion including a second aperture, a first in-rail connector disposed in the first railing portion, and a second in-rail connector disposed in the second railing portion. A baluster may extend through the first aperture and may be connected to the first in-rail connector The baluster may extend through the second aperture and may be connected to the second in-rail connector.

11 Claims, 9 Drawing Sheets

(56) References Cited

U.S. PATENT DOCUMENTS

| | | | | |
|---|---|---|---|---|
| 8,695,949 | B2* | 4/2014 | Stinson | E04H 17/143 256/64 |
| 8,833,737 | B2* | 9/2014 | Langenwalter | E04H 17/1426 256/67 |
| 2003/0201432 | A1* | 10/2003 | Norman | E04F 11/181 256/65.08 |
| 2005/0045863 | A1* | 3/2005 | MacKay | E04H 17/1443 256/59 |
| 2005/0067609 | A1* | 3/2005 | Walmsley | E04H 17/1439 256/65.01 |
| 2009/0026431 | A1* | 1/2009 | Tremblay | E04H 17/1443 256/65.03 |
| 2013/0264532 | A1* | 10/2013 | Goodman | E04H 17/1439 256/65.08 |

* cited by examiner

IN-RAIL CONNECTOR

CROSS-REFERENCE TO RELATED APPLICATION

This application claims the benefit of U.S. Provisional patent application Ser. No. 61/948,545, filed Mar. 5, 2014, which is hereby incorporated by reference in its entirety as though fully set forth herein.

TECHNICAL FIELD

This instant disclosure relates generally to an apparatus for connecting a baluster to a rail of a railing and/or a fence.

BACKGROUND

Conventional railing designs often require a discrete fastener, such as a bolt or a screw, and some sort of tool to drive the fastener, in order to connect a baluster to a rail or a fence. Assembling and/or manufacturing railings or fences that require such discrete fasteners or tools may require additional time, cost, and/or effort, such as centering components, measuring distances between balusters, locating drilling locations, drilling holes, and/or driving the fastener into the hole relative to a design that does not require a discrete fastener. A design that may eliminate one or more of the above activities from an assembly process may be desirable.

SUMMARY

The present disclosure includes a rail assembly that may include an in-rail connector that may allow for a baluster to be connected to one or more separated rail portions without the use of a fastener and/or without the use of any tools.

In embodiments, a railing assembly may comprise a first rail portion including a first aperture, a second rail portion including a second aperture, a first in-rail connector disposed in the first rail portion, a second in-rail connector disposed in the second rail portion, and/or a baluster. In embodiments, the baluster may extend through the first aperture and may be connected to the first in-rail connector. Additionally or alternatively, the baluster may extend through the second aperture and may be connected to the second in-rail connector.

In embodiments, an in-rail connector for a railing assembly may comprise a first side wall, a second side wall disposed opposite the first side wall, a third side wall disposed between and perpendicular to the first side wall and the second side wall, and/or a projection extending from the third side wall and between the first side wall and the second side wall. In embodiments, the projection may include a width that corresponds to a width of a corresponding baluster.

Additional features, advantages, and embodiments may be set forth or become apparent from consideration of the following detailed description and drawings. Moreover, it is to be understood that both the foregoing summary and the following detailed description are exemplary only and intended to provide explanation without limiting the scope of the disclosure as claimed.

BRIEF DESCRIPTION OF THE DRAWINGS

The accompanying drawings, which are included to provide a further understanding are incorporated in and constitute a part of this specification, illustrate preferred embodiments and, together with the detailed description, serve to explain the principles of embodiments of the disclosure.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure.

Referring to FIGS. 1, 2, 3, and 4, a railing assembly 10 may include a first in-rail connector 12, a second in-rail connector 12' a baluster 60, a first rail portion 70, and/or a second rail portion 80.

In embodiments, railing assembly 10 may include first in-rail connectors 12 that may include an elongated body 14 that may include a first side wall 20, a second side wall 30, a third side wall 40, and/or one or more projections 50. In embodiments, in-rail connector 12 may be configured as a single, unitary component. For example, and without limitation, elongated body 14 may be configured as a single, unitary component with first side wall 20, second side wall 30, third side wall 40, and/or the one or more projections 50 all being formed in a single process, which may include formation using a single die. Elongated body 14 may include a length 14A and/or a width 14B. In embodiments, elongated body 14 may include a generally shallow U-shaped configuration, which may open toward a baluster 60. Although first in-rail connector 12 is described herein in detail, second in-rail connector 12' may include the same or a similar configuration as first in-rail connector 12. For example, and without limitation, second in-rail connector 12' may include a elongated body 14', a first side wall 20', a second side wall 30', a third side wall 40', and/or a projection 50'. Projection 50' may include a height 50A', a width 50B', a wall 50C', and/or ribs 52'.

Figure 1:
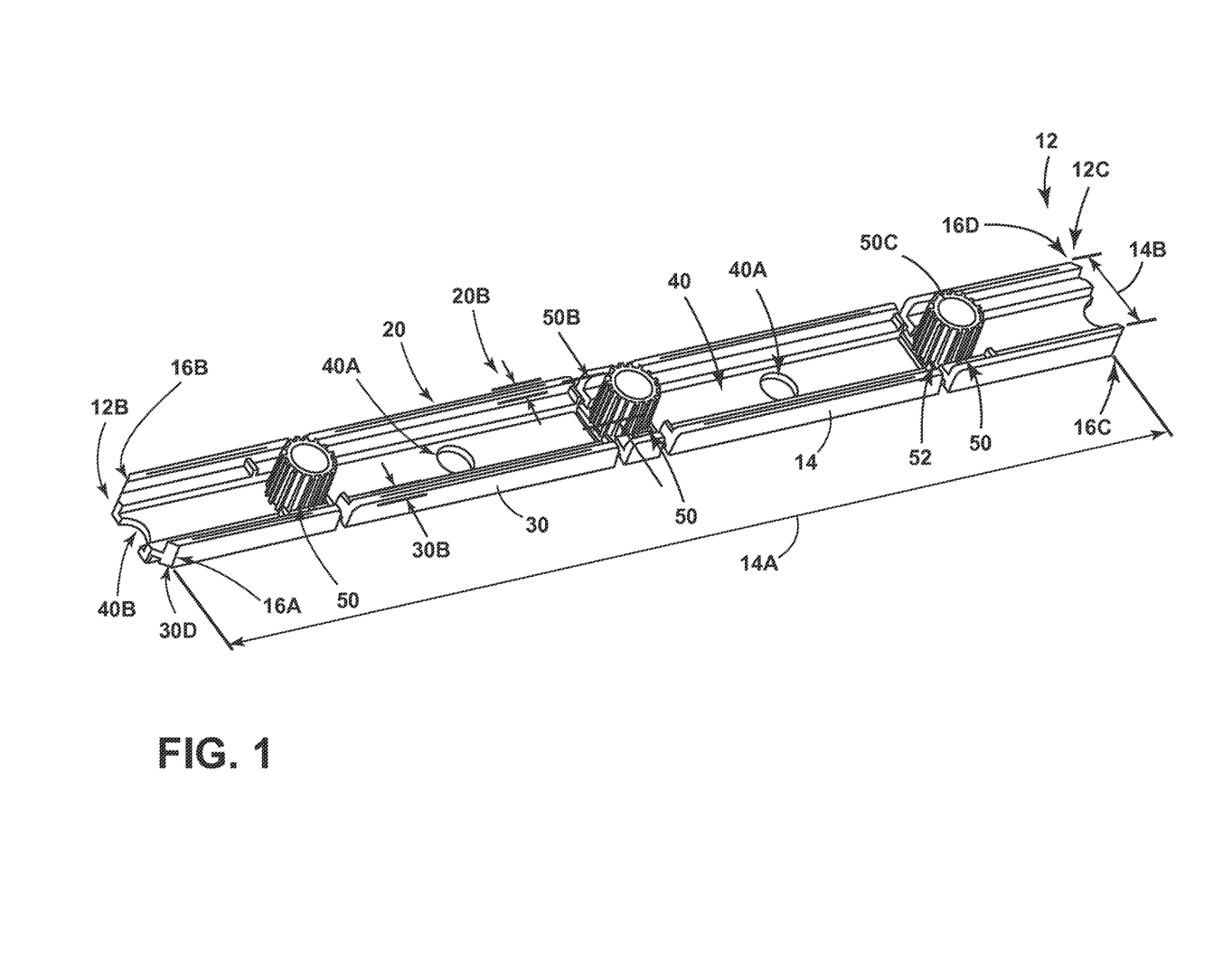
FIG. 1 is a perspective view generally illustrating an embodiment of an in-rail connector shown generally in accordance with teachings of the disclosure.

In embodiments, first side wall 20 and/or second side wall 30 may include heights 20A, 30A, widths 20B, 30B, bottom portions 20C, 30C, and/or middle portions 20D, 30D, respectively. First side wall 20 and second side wall 30 may be disposed generally parallel to each other and/or may be spaced from each other (e.g., by third side wall 40). Third side wall 40 may be disposed generally perpendicular to first side wall 20 and/or second side wall 30, and/or may be disposed generally between first side wall 20 and second side wall 30.

In embodiments, first rail portion 70 and/or second rail portion 80 may include one or more of a variety of shapes, sizes, and/or configurations. In embodiments, first rail portion 70 and/or second rail portion 80 may include lengths 70A, 80A, first ends 70B, 80B, second ends 70C, 80C, and/or longitudinal axes 70D, 80D, respectively. First rail portion 70 and/or second rail portion 80 may include a generally U-shaped cross section (e.g., viewed along axis 70D, 80D). Lengths 70A, 80A may generally correspond to a length of a section of a railing 10. For example, and without limitation, length 70A, 80A may be about six feet long and/or may be about eight feet long.

In embodiments, baluster 60 may be configured to extend between first rail portion 70 and second rail portion 80. Baluster 60 may include one or more of a variety of shapes, sizes, and/or configurations. Baluster 60 may include portions that may be generally solid and/or may include portions that may be generally hollow. For example, and without limitation, baluster 60 may include a generally hollow and elongated rectangular shape (e.g., a rectangular prism), a generally hollow and elongated cylinder shape, and/or an irregular shape. Baluster 60 may include a height 60D that may correspond to (e.g., be at least as great as) the distance between the first and second rail portions 70, 80. Baluster 60 may include longitudinal axis 60A, a width 60B, and/or a length/depth 60C. In embodiments, baluster 60 may include a rectangular, square, annular, and/or rounded cross-section (e.g., if viewed along longitudinal axis 60A). In embodiments, it may be desirable to connect baluster 60 to first rail portion 70 and/or second rail portion 80.

In embodiments, in-rail connector 12 may include one or more projections 50. Projections may be configured for connecting a baluster 60 to a rail portion (e.g., first rail portion 70 and/or second rail portion 80). Projections 50 may include one or more of a variety of shapes, sizes, and/or configurations. For example, and without limitation, projections 50 may include a generally cylindrical and/or conical shape that may extend (e.g., vertically) from third side wall 40 and/or may extend between first side wall 20 and second side wall 30. Projections 50 may include a height 50A and/or a width 50B. In embodiments in which projections 50 are generally annular and/or cylindrical, width 50B may correspond to a diameter of the projection. Width 50B may correspond to width 60B and/or length/depth 60C of baluster 60. Height 50A may be greater than the height 20A of first side wall 20 and/or the height 30A of second side wall 30. In embodiments, all projections 50 may be of substantially the same size and/or at least one projection may be of a different size than at least one other projection.

Figures 5A, 5B:
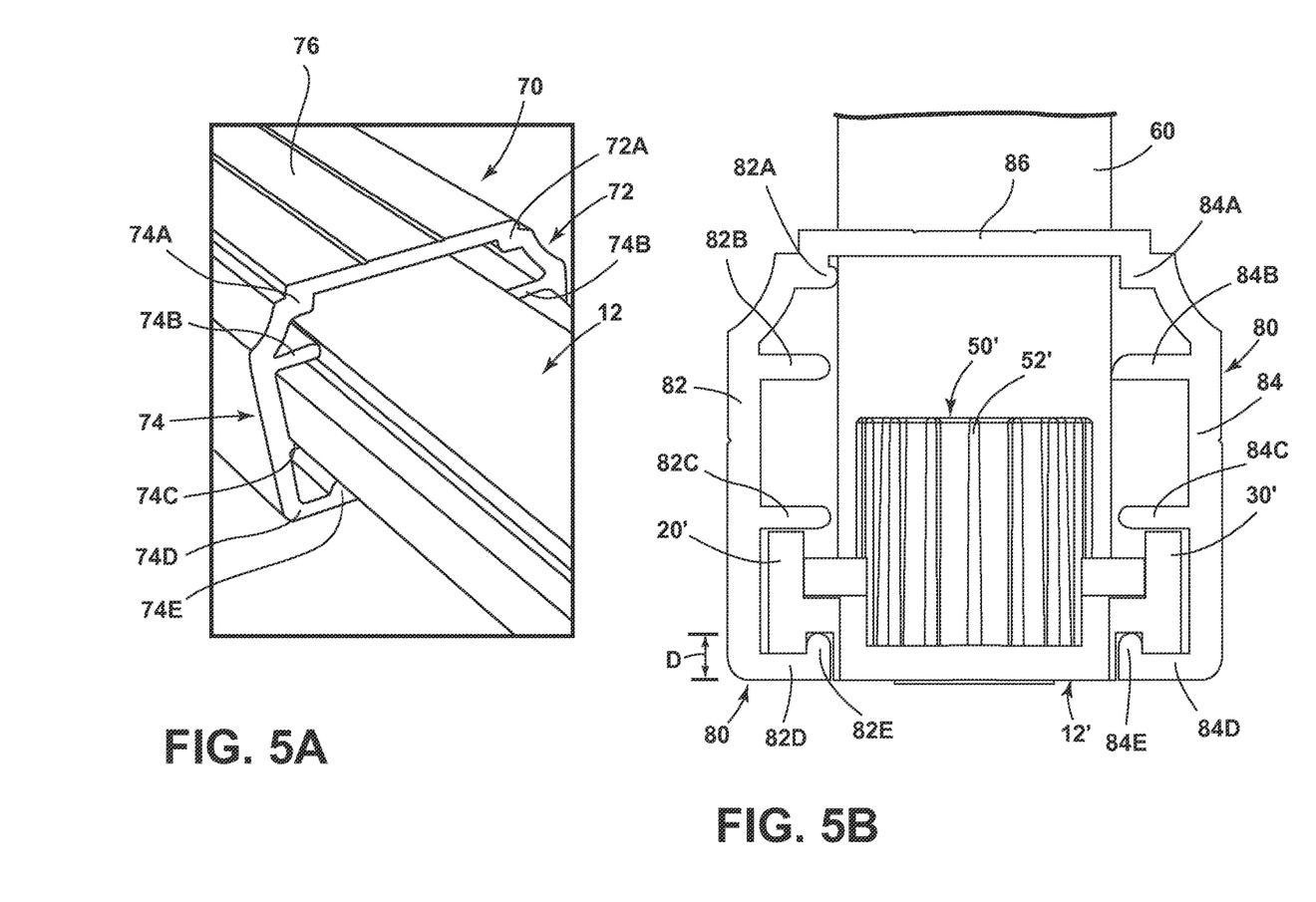
FIG. 5A is a perspective view generally illustrating portions of an embodiment of an in-rail connector and portions of an embodiment of a rail portion in accordance with teachings of the disclosure.
FIG. 5B is a cross-sectional view generally illustrating portions of an embodiment of an in-rail connector and portions of an embodiment of a rail in accordance with teachings of the disclosure.
Figure 6A:
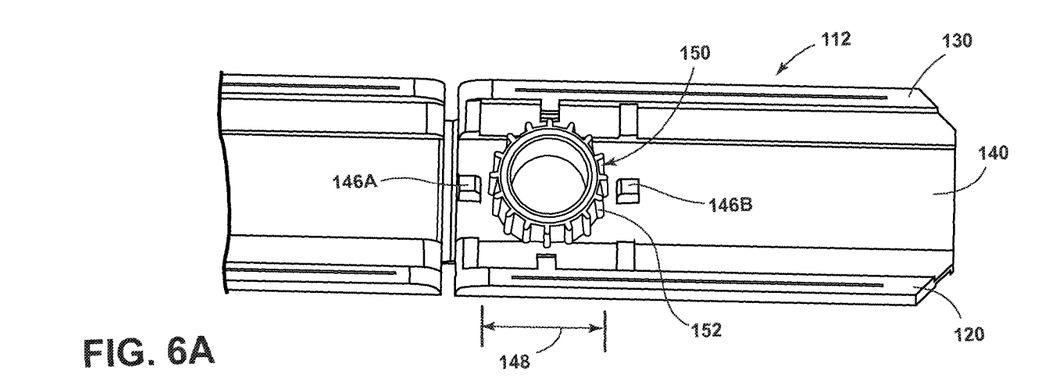
FIGS. 6A-6C are perspective views generally illustrating portions of embodiments of in-rail connectors in accordance with teachings of the disclosure.
Figure 6B:
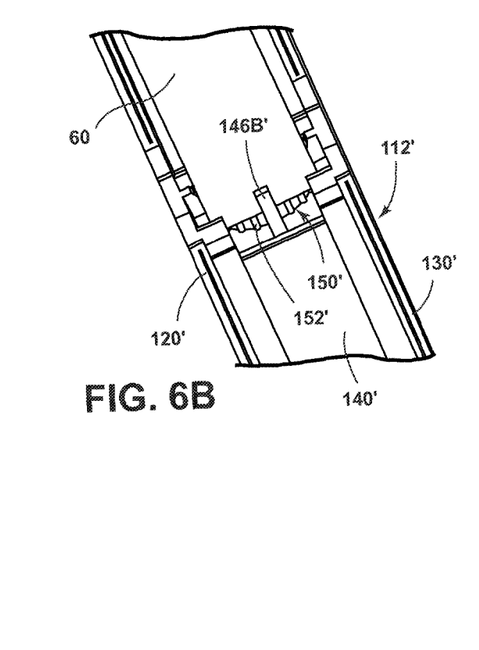
Figure 6C:
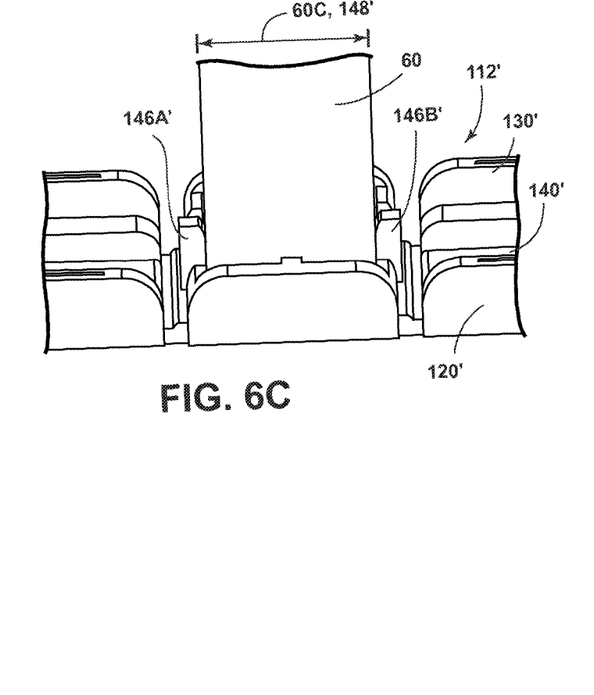

In embodiments, projections 50 of in-rail connectors 12 may include one or more ribs 52 that may, for example, be disposed vertically and/or horizontally. Ribs 52 may be configured to increase width 50B of a projection 50 and/or provide a press fit and/or interference fit between the projection 50 and a baluster 60. A press fit and/or interference fit may provide a connection between the baluster 60 and the projection 50 that may be permanent and/or semi-permanent. For example, and without limitation, a press fit and/or interference fit may permit the baluster 60 to be initially pushed onto (e.g., by a user, such as a railing installer) and/or connected to the projection 50, and/or may prevent and/or reduce subsequent movement of the baluster 60 in at least one direction (e.g., along axis 60A). A press fit and/or interference fit may allow for connection of a baluster 60 with a rail portion (e.g., first rail portion 70 and/or second rail portion 80) without the use of a fastener, such as, for example, a screw or a bolt and/or without requiring the use of any tools (e.g., screw driver, wrench, etc.). In embodiments, ribs 52 may include a taper, which may include being wider (e.g., in a radial direction) near a top of projection 50 (e.g., away from third wall 40) and narrower near a bottom of projection 50 (e.g., at or near third wall 40). In embodiments, such as generally illustrated in FIG. 5B, a projection 50, 50' may include a taper (e.g., may include a conical shape), which may include a wall 50C, 50C' of the projection 50, 50' being wider at the bottom (e.g., at or near third wall 40) and narrower near the top. In embodiments, tapers of walls 50C, 50C' and ribs 52, 52' may correspond to each other such that overall widths 50B, 50B' of projections 50, 50' (e.g., the outer width of ribs 52, 52') may be substantially constant.

In embodiments, projections 50 of in-rail connector 12 may be spaced from each other and may be spaced equally and/or unequally. The spacing of projections 50 may correspond to compliance with legal requirements, such as federal, state, and/or local building codes, that may set forth requirements regarding spacing of balusters 60. Additionally or alternatively, in embodiments, projections 50 may be spaced to correspond to and/or align with apertures (e.g., apertures 78, 88) in a rail portion (e.g., first rail portion 70 and/or second rail portion 80). Aligning apertures 78, 88 with projections 50 may permit a baluster 60 to extend through the apertures 78, 88 and/or to connect with a projection 50.

In embodiments, more than one in-rail connector 12 may be inserted into a rail portion (e.g., first rail portion 70 and/or second rail portion 80). In embodiments, the number of in-rail connectors 12 inserted into a rail portion 70, 80 may correspond to the length of the rail portion. For example, and without limitation, five in-rail connectors may be inserted into a six foot section of rail portion and/or seven in-rail connectors may be inserted into an eight-foot section of rail portion.

In embodiments, the length 12A of an in-rail connector 12 and/or the length 14A of body 14 may be configured to correspond to the length 70A, 80A of the rail portion 70, 80 into which the in-rail connectors 12 may be intended for insertion. For example, and without limitation, first rail portion length 70A and/or second rail portion length 80A may be about six feet or about eight feet, which may correspond to in-rail connector length 12A being about one foot and/or about 13⅜ inches, respectively. In embodiments, in-rail connectors 12 may include a number of projections 50 that may correspond to the length of the in-rail connector 12. For example, and without limitation, an in-rail connector 12 having a length 12A of about one foot may include three projections 50 and/or an in-rail connector 12 having a length 12A of about 13⅜ inches may include four projections 50. In embodiments, in-rail connector length 14A may be equal to, shorter than, or longer than 13⅜ inches. In-rail connectors 12 with relatively short lengths 12A compared to lengths 70A, 80A of rail portions 70, 80 may allow for a shorter press length (e.g., an insertion distance), which may allow for easier installation. Additionally or alternatively, if a length 12A of in-rail connectors 12 is relatively short compared to lengths 70A, 80A of rail portions 70, 80, in-rail connectors 12 may be configured to be modular and/or may allow for the same embodiment of an in-rail connector 12 to be used with rail portions 70, 80 of differing lengths.

Figure 2:
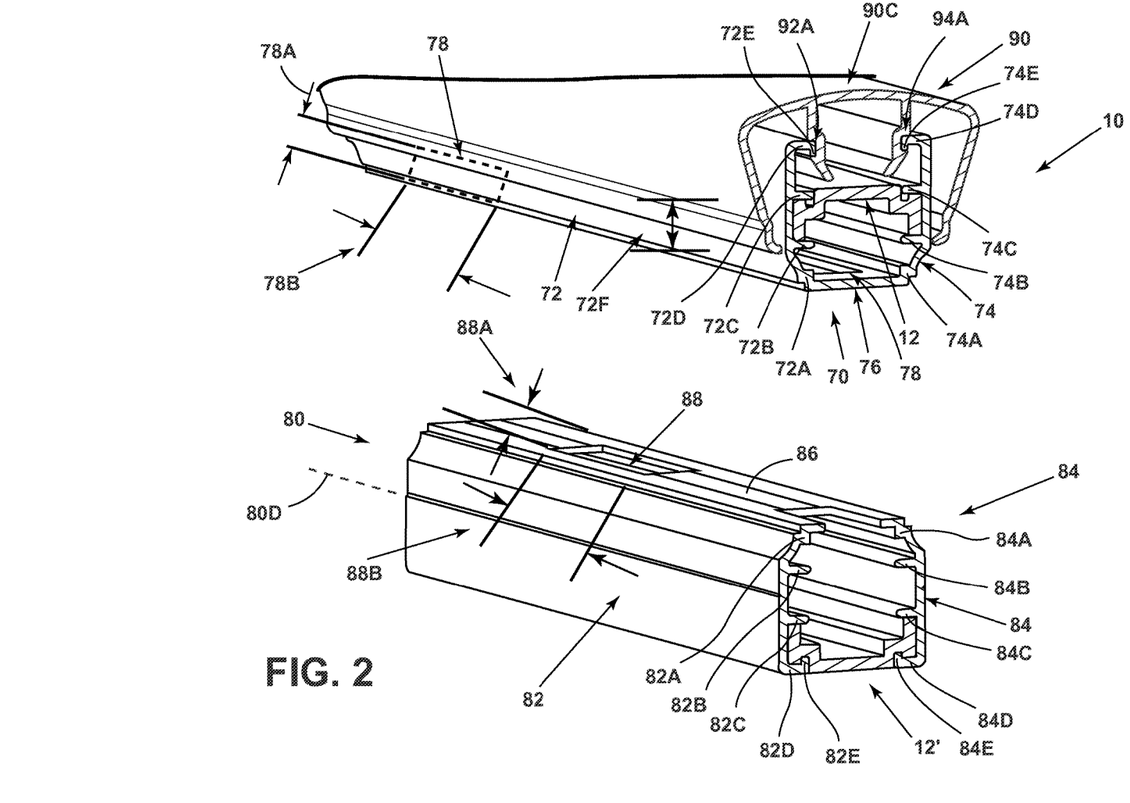
FIG. 2 is a perspective view generally illustrating portions of embodiments of in-rail connectors, a cover, and first and second rail portions in accordance with teachings of the disclosure.

In embodiments, such as generally illustrated in FIG. 2, first rail portion 70 may include a first side wall 72, a second side wall 74, and/or a third side wall 76. In embodiments, second rail portion 80 may include a first side wall 82, a second side wall 84, and/or a third side wall 86. Side walls 72, 74, 82, 84 may include one or more protrusions. For example and without limitation, first side wall 72 may include first protrusion 72A, second protrusion 72B, third protrusion 72C, fourth protrusion 72D; second side wall 74 may include first protrusion 74A, second protrusion 74B, third protrusion 74C, fourth protrusion 74D; first side wall 82 may include first protrusion 82A, second protrusion 82B, third protrusion 82C, fourth protrusion 82D; and/or second side walls 84 may include first protrusion 84A, second protrusion 84B, third protrusion 84C, fourth protrusion 84D. In embodiments, protrusions may extend generally perpendicular to their respective side wall (e.g., generally inward) and/or may extend generally parallel to respective third side walls 76, 86. In embodiments, first rail portion 70 and second rail portion 80 may be substantially and/or exactly the same and descriptions herein relating to embodiments of first rail portion 70 may also be applicable to embodiments of second rail portion 80. In embodiments, first rail portion 70 and/or second rail portion 80 may include a generally U-shaped configuration, which may open away from the other of first rail portion 70 and second rail portion 80.

In embodiments, first side wall 20 and/or second side wall 30 of in-rail connector 12 may be configured to cooperate with a rail portion, such as, for example, first rail portion 70 and/or second rail portion 80. As generally illustrated in FIGS. 2-5B, a height 20A of first side wall 20 and/or a height 30A of second side wall 30 may be configured such that an in-rail connector 12 may be inserted into first rail portion 70 and/or second rail portion 80. For example, and without limitation, an in-rail connector 12 may be inserted between second and third protrusions 72B, 72C of side wall 72 and between second and third protrusions 74B, 74C of side wall 74, and/or an in-rail connector 12' may be inserted between protrusions 82C, 82D of side wall 82 and protrusions 84C, 84D of side wall 84. In embodiments, first side wall 20 and/or second side wall 30 of in-rail connector 12 may be configured to cooperate with protrusions of first rail portion 70 and/or second rail portion 80. For example, and without limitation, first side wall 20 may be configured to fit between third protrusion 72C and fourth protrusion 72D, and/or second side wall 30 may be configured to fit between third protrusion 74C and fourth protrusion 74D. Additionally or alternatively, a height (e.g., heights 20A, 30A) of a side wall (e.g., first side wall 20 and/or second side wall 30) of an in-rail connector 12 and/or a distance between a third protrusion (e.g., 72C) and a fourth protrusion (e.g., 72D) may be configured such that a side wall (e.g., side wall 20) of in-rail connector 12 may be inserted between the protrusions 72C, 72D of side wall 72.

In embodiments, sidewalls 20, 30 of in-rail connector 12 and one or more protrusions of a rail portion (e.g., first rail portion 70 and/or second rail portion 80) may be configured such that once an in-rail connector 12 is inserted into a rail portion to a desired position, the in-rail connector 12 is configured to remain substantially stationary with respect to the rail portion. For example, and without limitation, in-rail connector 12 and rail portion 70 may be configured for a press fit and/or interference fit, which may include height 20A of first side wall 20 sufficiently corresponding to the distance 72F between second protrusion 72B and third protrusion 72C such that there may be enough friction between first side wall 20 and protrusions 72B, 72C and/or side wall 72 to hold in-rail connector 12 in place relative to first rail portion 70 once insertion is complete. A press fit and/or interference fit may permit a permanent and/or semi-permanent connection between an in-rail connector 12 and a rail portion without the use of a fastener, such as a bolt or a screw, which may simplify installation and/or assembly of a railing 10.

As generally illustrated in FIG. 1, in-rail connector 12 may include one or more tapered portions, such as tapered portions 16A, 16B, 16C, 16D. Tapered portions may include reduced lengths, widths, and/or heights of portions of in-rail connector 12, such as first side wall 20, second side wall 30, and/or third side wall 40. Tapered portions 16 may be located generally at or near a first end 12B and/or a second end 12C of in-rail connector 12. Tapered portions may be configured to facilitate initial insertion of an in-rail connector 12 into a rail portion (e.g., first rail portion 70 and/or second rail portion 80).

Figure 3A:
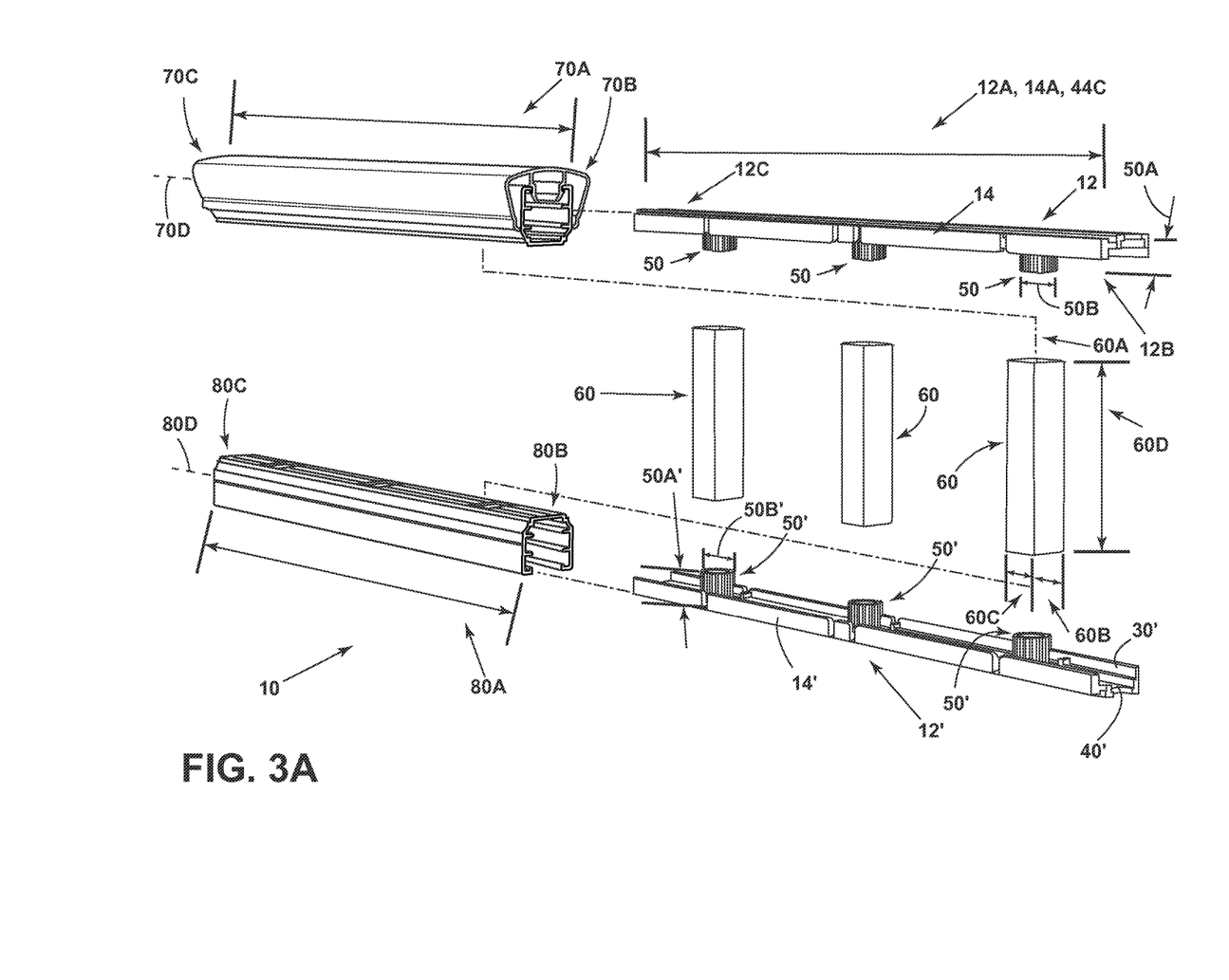
FIGS. 3A and 3B are exploded views generally illustrating embodiments of in-rail connectors, balusters, and first and second rail portions in accordance with teachings of the disclosure.
Figure 3B:
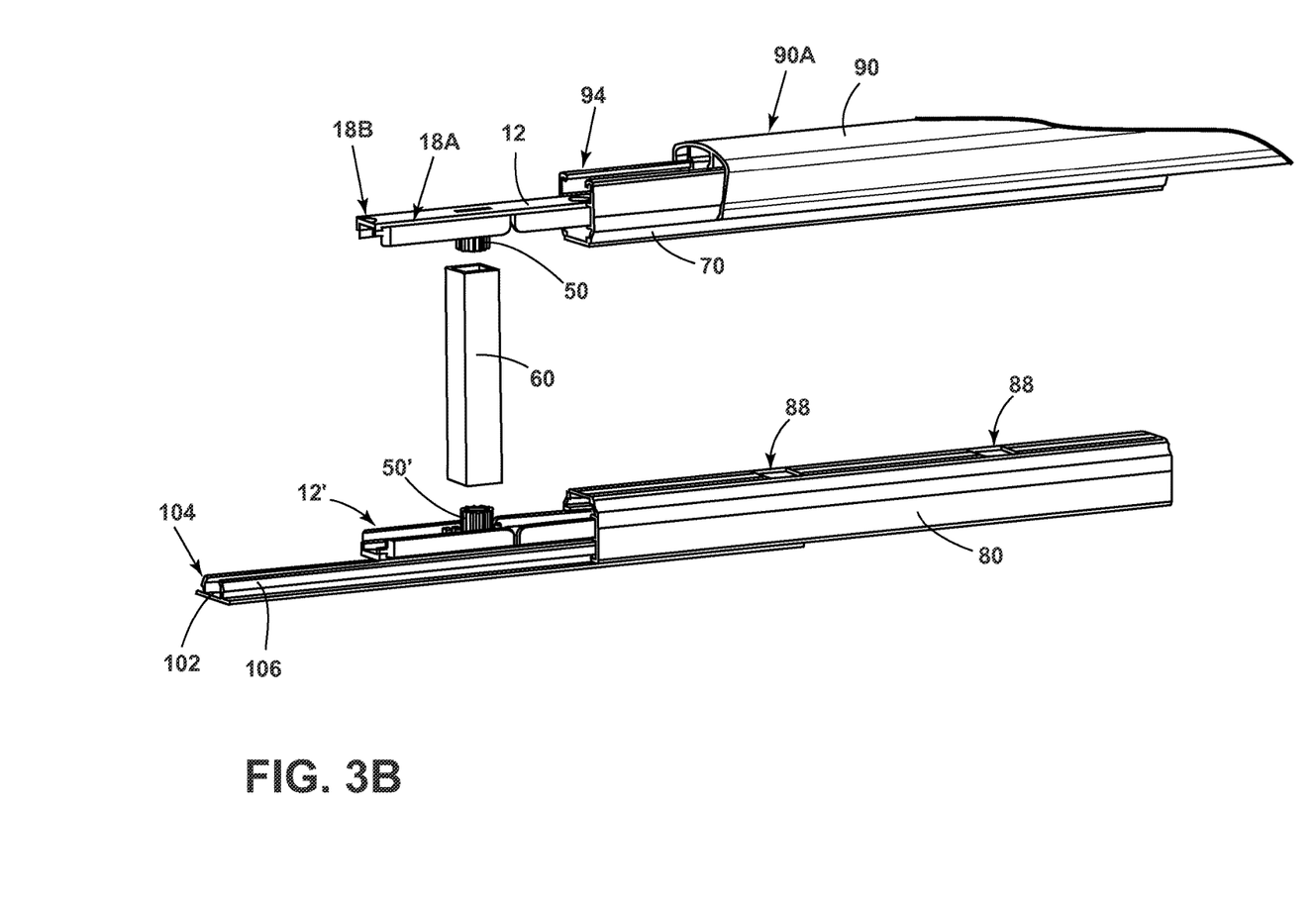
Figure 4:
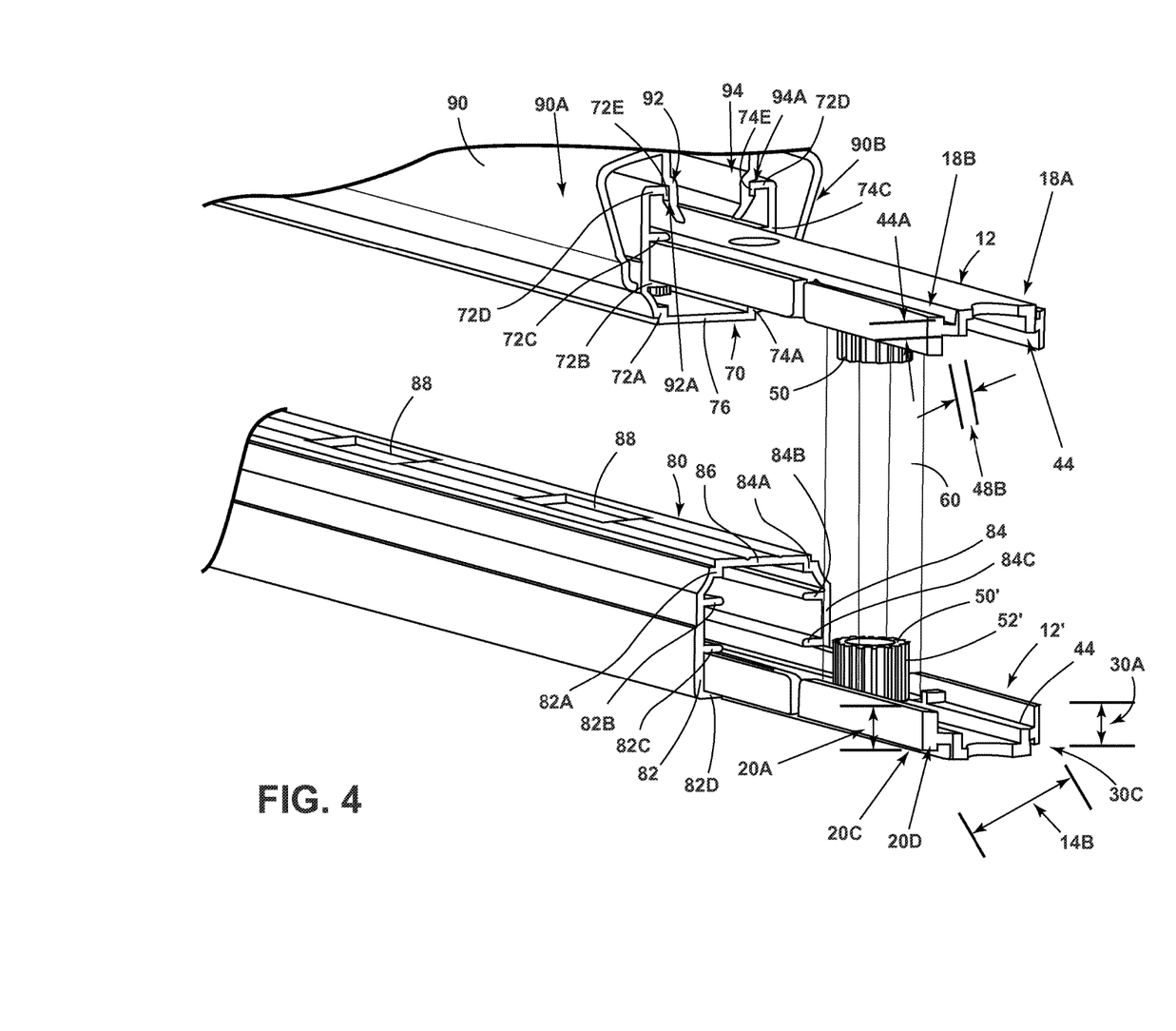
FIG. 4 is a perspective view generally illustrating portions of embodiments of in-rail connectors, a baluster, and first and second rail portions in accordance with teachings of the disclosure.

In embodiments, such as generally illustrated in FIGS. 2-4, first rail portion 70 and/or second rail portion 80 may include one or more apertures, such as, for example, apertures 78, 88. Apertures 78, 88 may be configured to receive at least a portion of a baluster 60 and/or may be configured to prevent and/or reduce rotation of a baluster 60 after the baluster 60 has been connected with an in-rail connector 12. Apertures 78, 88 may include one or more of a variety of shapes, sizes, and/or configurations. In embodiments, the shape of an aperture may correspond to a shape of a baluster 60. For example, and without limitation, apertures 78, 88 may include a generally rectangular shape that may correspond to baluster 60 including a generally square and/or rectangular cross section (e.g., if viewed along axis 60A). The dimensions of apertures 78, 88 may be configured such that if a baluster 60 is at least partially received in the aperture, baluster 60 may not be able to rotate or may not be able to rotate a significant amount. For example, and without limitation, widths 78A, 88A of apertures 78, 88 may be substantially equal to width 60B of a baluster, and/or lengths 78B, 88B of apertures 78, 88 may be substantially equal to length 60C of baluster 60.

In embodiments, such as generally illustrated in FIGS. 1-5B, first side wall 20 and/or second side wall 30 may be disposed such that they are not aligned with third side wall 40. For example, and without limitation, first side wall 20 and/or second side wall 30 may be disposed such that if third side wall 40 is placed on a planar surface, bottom portion 20C of first side wall 20 and/or bottom portion 30C of second side wall 30 may not be in contact with the planar surface (e.g., may be disposed at a distance D from the planar surface).

In embodiments, as generally illustrated in FIGS. 1-5B, in-rail connector 12 may include one or more transverse portions 44. Transverse portions 44 may be configured to connect first side wall 20 and/or second side wall 30 with third side wall 40. Transverse portions 44 may be disposed generally parallel with third side wall 40 and/or generally perpendicular to first side wall 20 and/or second side wall 30. Transverse portions 44 may include a height 44A, a width 44B and/or a length 44C. Transverse portions 44 may contact and/or intersect with side walls (e.g., first side wall 20 and/or second side wall 30) at ends of the side walls (e.g., bottom portions 20C, 30C) and/or in the middle of side walls (e.g., middle portions 20D, 30D). In embodiments, transverse portions 44 may contact and/or intersect side walls 20, 30 in the middle of side walls (e.g., at or near middle portions 20D, 30D), which may result in the formation of a recess/channel, such as recesses 18A, 18B.

In embodiments, such as generally illustrated in FIGS. 2, 3A, 3B, and 4, a railing assembly 10 may include a top profile, such as a cover 90. Cover 90 may include a first side wall 90A, a second side wall 90B, and one or more snapping portions 92, 94 that may generally extend from a center portion 90C of cover 90 and/or be disposed between first side wall 90A and second side wall 90B. Snapping portions 92, 94 may include recessed portions 92A, 94A that may correspond to flange portions 72E, 74E. For example, and without limitation, snapping portion 92 may be configured to cooperate with first protrusion 72A of first rail portion 70 and/or cover 90 may be configured to slide over first rail portion 70 until flange portions 72E, 74E engages recesses 92A, 94A (e.g., to snap into first rail portion 70). In embodiments, an in-rail connector 12 may be disposed between protrusions 72C, 72D and 74C, 74D (e.g., in a "top" position of first rail portion 70); however, such a configuration may prevent cover 90 from being inserted, so in-rail connector 12 may instead be disposed between protrusions 72B, 72C and 74B, 74C (e.g., in a "middle" position of first rail portion 70).

In embodiments, such as generally illustrated in FIGS. 2-5B, a protrusion of a rail portion side wall (e.g., protrusion 72A and/or protrusion 82A) may include a flange portion, such as flange portion 72E and/or flange portion 82E. Flange portions may correspond to (e.g., be configured for engagement with) recesses 18A, 18B of in-rail connector 12 and/or to recesses 92A, 92B of a cover 90.

Figure 7A:
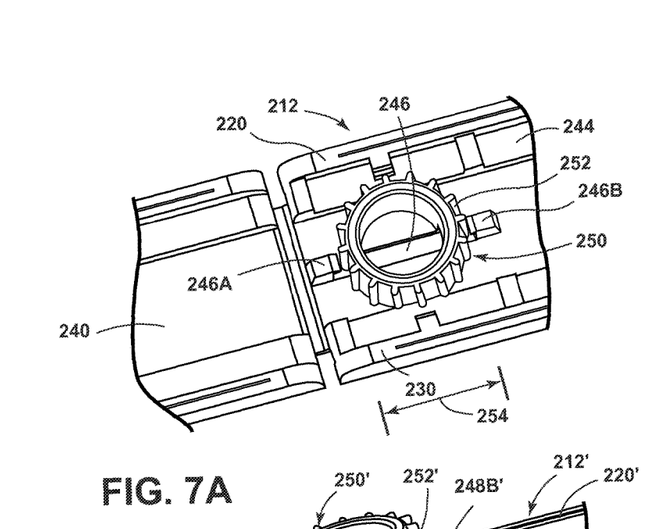
FIGS. 7A and 7B are perspective views generally illustrating portions of embodiments of in-rail connectors in accordance with teachings of the disclosure.
Figure 7B:
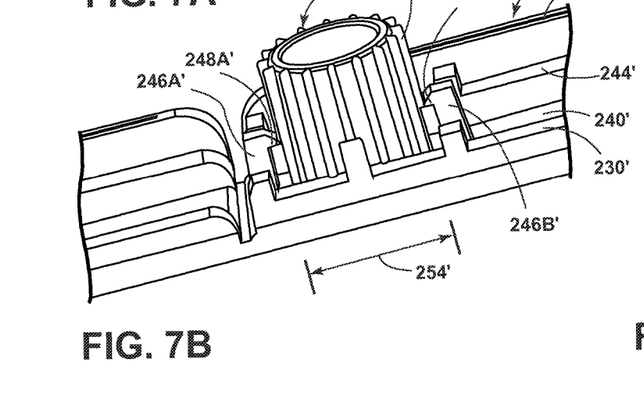
Figure 7C:
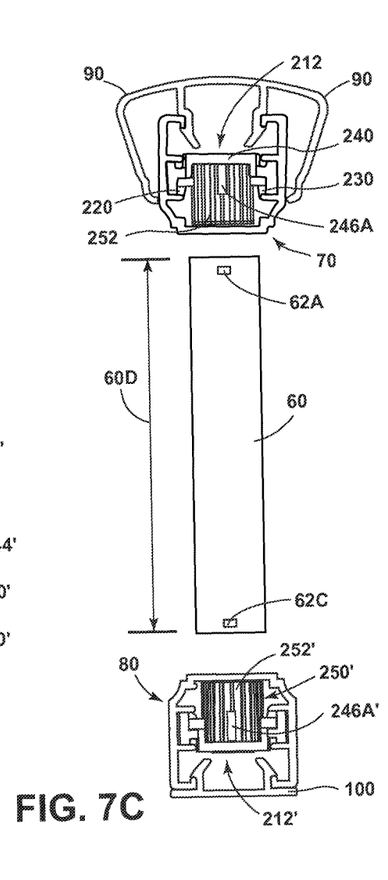
FIG. 7C is a cross-sectional view generally illustrating portions of an embodiment of an in-rail connector and portions of an embodiment of a rail portion in accordance with teachings of the disclosure.
Figure 7D:
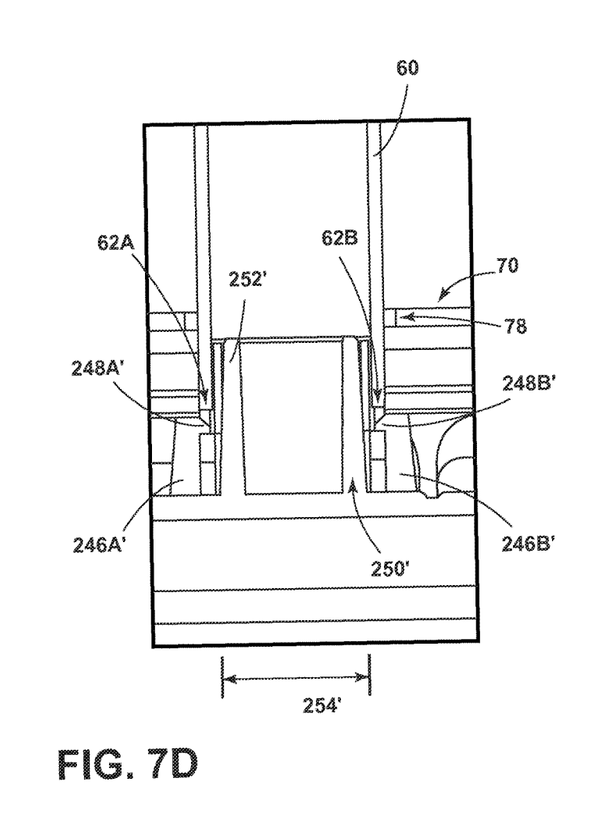
FIGS. 7D and 7E are cross sectional views generally illustrating portions of embodiments of an in-rail connector, a rail portion, and a baluster in accordance with teachings of the disclosure.
Figure 7E:
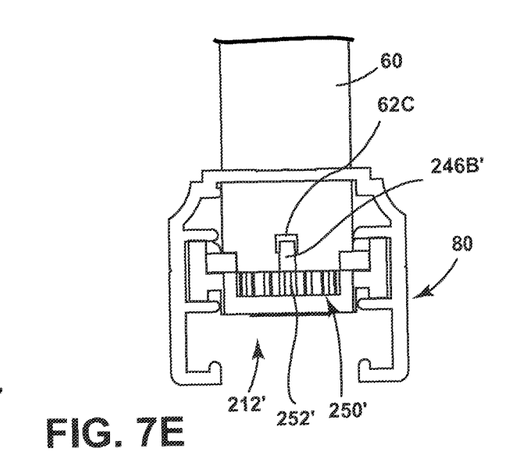
Figure 7F:
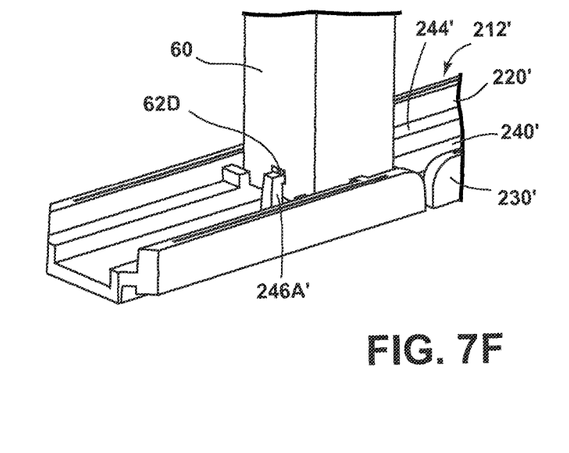
FIG. 7F is a perspective view generally illustrating portions of an embodiment of an in-rail connector and portions of an embodiment of a baluster in accordance with teachings of the disclosure.

In embodiments, such as generally illustrated in FIG. 3B (and FIG. 7C), a railing assembly 10 may include a bottom profile, such as a cap 100, that may be configured to cap and/or cover an open portion of a rail portion (e.g., the bottom of rail portion 80). Cap 100 may include a generally planar main surface 102 and/or one or more projections 104, 106. Projections 104, 106 may be configured to engage flanges of a rail portion (e.g., flanges 82E, 84E of second rail portion 80). In embodiments, cap 100 may slide into engagement with rail portion 80 (e.g., from an end) and/or may be pressed into place vertically (e.g., projections 104, 106 may be sufficiently resilient to initially deflect inward to pass flanges 82E, 84E). In embodiments including a cap 100, an in-rail connector 12 may be disposed/inserted between protrusions 82B, 82C and protrusions 84B, 84C (e.g., in a "middle" position).

In embodiments, such as generally illustrated in FIG. 1, third side wall 40 of in-rail connector 12 may include one or more apertures, such as apertures 40A. Apertures 40A may be configured for installation of in-rail lighting. Apertures 40A may be configured to act as a template for drilling holes, such as 11/32" holes (e.g., into third walls 76, 86), to accommodate in-rail lighting. Apertures 40A may be equally or not equally spaced between projections 50. In embodiments, third side wall 40 of in-rail connector 12 may include one or more recesses 40B that may be disposed at or near ends 12B, 12C of in-rail connector 12. Recesses 40B may be configured to correspond to recesses 40B of another in-rail connector 12 and/or if two in-rail connectors 12 are disposed adjacent to one another (e.g., end-to-end), recesses 40B of the respective in-rail connectors 12 may cooperate to effectively form an aperture, which may be substantially the same as apertures 40A.

In embodiments, such as generally illustrated in FIGS. 6A-7F, an in-rail connector (e.g., in-rail connectors 112, 112', 212, 212') may include one or more features to help retain a baluster 60 relative to the in-rail connector. For example, and without limitation, in-rail connector 112 may include one or more secondary projections 146A, 146B. Secondary projections 146A, 146B may extend (e.g., vertically) from a third side wall 140 that may be disposed between first side wall 120 and second side wall 130 of in-rail connector 112. Secondary projections 146A, 146B may be disposed such they contact baluster 60 upon connection of baluster 60 with a projection 150 of in-rail connector 112. For example, and without limitation, secondary projections 146A, 146B may be disposed on opposite sides of projection 150 (e.g., may be spaced by about 180 degrees) and/or may be separated from each other by a distance 148 that corresponds to length 60C of baluster 60. In embodiments, projection, 150, 150' may include the same or similar configuration as projections 50, 50'. For example, and without limitation, projections 150, 150' may include ribs 152, 152', respectively, that may be tapered. In embodiments, distance 148 may be about the same as or smaller than length 60C, which may correspond to an interference and/or press fit of baluster 60 relative to secondary projections 146A, 146B. Secondary projections 146A, 146B may include tapered portions (e.g., at or near the tops of secondary projections 146A, 146B) which may ease insertion of baluster 60 between secondary projections 146A, 146B (and over projection 150). Although first in-rail connector 112 is described herein in detail, second in-rail connector 112' may include the same or a similar configuration as first in-rail connector 112. For example, and without limitation, second in-rail connector 112' may include a first side wall 120', a second side wall 130', a third side wall 140', a first secondary projection 146A', a second secondary projection 146B', and a projection 150'. First secondary projection 146A' and second secondary projection 146B' may be separated by a distance 148'.

In embodiments, such as generally illustrated in FIGS. 7A-7F, it may be desirable to positively lock a baluster 60 in place relative to an in-rail connector (e.g., in-rail connector 212). For example, and without limitation, in-rail connector 212 may include secondary projections 246A, 246B that may be generally hook-shaped and/or include hooked portions 248A, 248B, respectively. Secondary projections 246A, 246B may extend from third wall 240 and/or between first side wall 220 and second side wall 230 of in-rail connector 212. In embodiments, secondary projections may be configured to positively engage a baluster 60, such as via apertures/recesses 62A, 62B. Secondary projections 246A, 246B may be resilient and/or configured to deflect. For example, and without limitation, if baluster 60 is assembled to in-rail connector 212 (e.g., by being pressed vertically over a projection 250 of in-rail connector 212), secondary projections 246A, 246B may initially deflect outwardly until apertures 62A, 62B are aligned with hooked portions 248A, 248B of secondary projections 246A, 246B, and then secondary projections 246A, 246B may deflect back toward an initial position such that hooked portions 248A, 248B engage apertures 62A, 62B. If secondary projections 246A, 246B engage apertures 62A, 62B, secondary projections 246A, 246B may limit and/or prevent vertical and/or rotational movement of baluster 60 relative to in-rail connector 212, which may result in baluster 60 being positively secured to in-rail connector 212 without requiring the use of separate fasteners or the use of any tools. Secondary projections 246A, 246B having hooked portions 248A, 248B may be referred to herein as hooked projections 246A, 246B.

In embodiments, hooked portions 248A, 248B of secondary projections 246A, 246B may be separated by a distance 254. Distance 254 may correspond to length/depth 60C of baluster 60, which may include being less than length/depth 60C. Hooked portions 248A, 248B may include tapers, such as on respective top sides, which may help insertion of baluster 60 between hooked portions 248A, 248B. For example, and without limitation, baluster 60 may slide along the tapers during insertion, which may cause secondary projections to deflect outwardly. In embodiments, a baluster 60 may be pressed over projections 250, 250' such that it rests on transverse portions 244, 244', respectively, without completely covering projections 250, 250' (see, e.g., FIGS. 7A-7F). In embodiments, projections 250, 250' may be configured the same as or similar to projections 50, 50', 150, 150'. For example, and without limitation, projections 250, 250' may include ribs 252, 252', respectively, that may be tapered.

In embodiments, in-rail connector may include an aperture 246C that may extend between secondary projections 246A, 246B and/or underneath projection 250. In embodiments, aperture 246C may include one or more of a variety of shapes, sizes, and/or configurations. For example, and without limitation, aperture 246C may include a generally rectangular shape that may be about as wide as secondary projections 246A, 246B and/or as long as distance 254.

Although first in-rail connector 212 is described herein in detail, second in-rail connector 212' may include the same or a similar configuration as first in-rail connector 212. For example, and without limitation, second in-rail connector 212' may include a first side wall 220', a second side wall 230', a third wall 240', a first secondary projection 246A' with a hooked portion 248A', a second secondary projection 246B' with a hooked portion 248B', and a projection 250'. Hooked portions 248A' and 248B' may be separated by a distance 254'.

In embodiments, such as generally illustrated in FIGS. 7A-7F, a method of assembling a rail assembly may include providing a first rail portion 70, a second rail portion 80, first and second in-rail connectors 212, 212', and a baluster 60. The first in-rail connector 212 may then be inserted into the first rail portion 70 and the second in-rail connector 212 into the second rail portion 80. The baluster 60 may then be inserted through an aperture 78 in the first rail portion 70. The baluster 60 may then be secured to the first in-rail connector 212 without fasteners or tools by pressing the baluster 60 over a projection 50 of the first in-rail connector 212 such that a plurality of hooked projections 246A, 246B of the first in-rail connector 212 engage a first plurality of apertures 62A, 62B of the baluster 60. The baluster 60 may then be inserted through an aperture 88 in the second rail portion 80. The baluster 60 may then be secured to the second in-rail connector 212' without fasteners or tools by pressing the baluster 60 over a projection 50 of the second in-rail connector 212' such that a plurality of hooked projections 246A', 246B' of the second in-rail connector 12 engage a second plurality of apertures 62C, 62D of the baluster 60.

Additional details regarding railing assemblies may be described in U.S. Provisional Patent Application No. 61/948,523, filed Mar. 5, 2014, which is hereby incorporated by reference in its entirety as though fully set forth herein.

Although particular embodiments of the present disclosure have been described in detail herein with reference to the accompanying drawings, it is to be understood that the present disclosure is not limited to those particular embodiments, and that various changes and modifications may be effected therein by one skilled in the art without departing from the scope or spirit of the present disclosure. Numerous specific details are set forth and/or illustrated to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment of this disclosure has been described and illustrated with a certain degree of particularity, those skilled in the art could make numerous alterations to the disclosed embodiment without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and can include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure can be made without departing from the spirit of the disclosure.

What is claimed is:

1. A railing assembly, comprising:
a first rail portion including a first aperture;
a second rail portion including a second aperture;
a first in-rail connector disposed in the first rail portion, wherein the first in-rail connector comprises an elongated body and a projection extending from the elongated body towards the second rail portion;
a second in-rail connector disposed in the second rail portion, wherein the second in-rail connector comprises an elongated body and a projection extending from the elongated body towards the second rail portion; and
a baluster;
wherein an upper end of the baluster extends through the first aperture and is frictionally connected to the first in-rail connector by movement of the upper end of the baluster in a direction transverse to the first rail portion, and wherein a lower end of the baluster extends through the second aperture and is frictionally connected to the second in-rail connector by movement of the lower end of the baluster in a direction transverse to the second rail portion.

2. The railing assembly of claim 1, wherein the projection of the first in-rail connector and the projection of the second in-rail connector each include a plurality of vertical ribs and/or a plurality of horizontal ribs.

3. The railing assembly of claim 2, wherein at least one of the plurality of ribs is tapered such that it includes a smaller radial width at its bottom and a greater radial width at its top, and the bottom of the at least one of the plurality of ribs being disposed at and/or near the third side wall.

4. The railing assembly of claim 1, wherein the first in-rail connector includes a first side wall, a second side wall, and a third side wall; and, the third side wall is disposed between the first side wall and the second side wall.

5. The railing assembly of claim 4, wherein
the first in-rail connector includes a resilient secondary projection that extends from the third side wall, and has a hooked portion configured to engage an aperture of the baluster.

6. The railing assembly of claim 5, wherein the resilient secondary projection is a first resilient secondary projection;
the aperture of the baluster is a first aperture; and
the first in-rail connector includes a second resilient secondary projection that extends from the third side wall and has a hooked portion configured to engage a second aperture of the baluster.

7. The railing assembly of claim 5, wherein
the first in-rail connector includes a first projection extending from the third side wall;
the second in-rail connector includes a second projection;
the second in-rail connector includes first and second secondary projections each including hooked portions configured to engage third and fourth apertures of the baluster; and the baluster is press fit over the first projection and over the second projection such that
the first secondary projection of the first in-rail connector is engaged with the first aperture of the baluster;
the second secondary projection of the first in-rail connector is engaged with the second aperture of the baluster;
the first secondary projection of the second in-rail connector is engaged with the third aperture of the baluster; and
the second secondary projection of the second in-rail connector is engaged with the fourth aperture of the baluster.

8. The railing assembly of claim 7, wherein the baluster is secured to the first rail portion via the first in-rail connector and secured to the second rail portion via the second in-rail connector without additional fasteners.

9. The railing assembly of claim 8, wherein the first in-rail connector is formed as a single, unitary component.

10. The railing assembly of claim 1, wherein the apertures of the first and second rail portions include shapes that correspond to a cross-sectional shape of the baluster such that upon insertion of the baluster into the aperture of the first rail portion and/or into the aperture of the second rail portion, the baluster is not permitted to rotate.

11. A method of assembling a railing, the method comprising:
providing a first rail portion,
providing a second rail portion,
providing a first in-rail connector, wherein the first in-rail connector comprises an elongated body and a projection extending from the elongated body towards the second rail portion,
providing a second in-rail connector, wherein the second in-rail connector comprises an elongated body and a projection extending from the elongated body towards the second rail portion, and
providing a baluster;
inserting the first in-rail connector into the first rail portion;
inserting the second in-rail connector into the second rail portion;
inserting the baluster through an aperture in the first rail portion;
securing the baluster to the first in-rail connector without fasteners or tools by pressing the baluster over the projection of the first in-rail connector such that a plurality of hooked projections of the first in-rail connector engage a first plurality of apertures of the baluster;
inserting the baluster through an aperture in the second rail portion; and
securing the baluster to the second in-rail connector without fasteners or tools by pressing the baluster over the projection of the second in-rail connector such that a plurality of hooked projections of the second in-rail connector engage a second plurality of aperture of the baluster.

* * * * *